United States Patent

[11] 3,627,347

| [72] | Inventor | Edward J. Herbenar<br>Detroit, Mich. |
|---|---|---|
| [21] | Appl. No. | 880,283 |
| [22] | Filed | Nov. 26, 1969 |
| [45] | Patented | Dec. 14, 1971 |
| [73] | Assignee | TRW, Inc.<br>Cleveland, Ohio |

[54] IDLER ARM JOINT
4 Claims, 4 Drawing Figs.

| [52] | U.S. Cl. | 280/95 A |
|---|---|---|
| [51] | Int. Cl. | B62d 17/00 |
| [50] | Field of Search | 280/95<br>A-95 R; 287/93 |

[56] References Cited
UNITED STATES PATENTS

| 2,592,280 | 4/1952 | Herbenar | 280/95 I |
|---|---|---|---|
| 2,833,551 | 5/1958 | Dick | 280/95 I |
| 2,856,196 | 10/1958 | Fowler | 280/95 I |
| 3,010,746 | 11/1961 | Melton et al. | 280/95 I |
| 3,163,451 | 12/1964 | Krizman | 280/95 I |
| 3,275,338 | 9/1966 | Herbenar et al. | 280/95 I |
| 3,428,345 | 2/1969 | Ryszewski | 287/93 |

*Primary Examiner*—Benjamin Hersh
*Assistant Examiner*—Robert R. Song
*Attorney*—Hill, Sherman, Meroni, Gross & Simpson ABSTRACT: A bracket support joint for an idler arm in the steering linkage of the dirigible wheels of a vehicle. The support includes a bracket portion and a joint portion, the bracket having a hollowed end internally threaded which receives an externally threaded bolt which in turn is press fitted into the idler arm linkage member with the bolt extending upwardly into the internally threaded end of the bracket member.

PATENTED DEC 14 1971
3,627,347
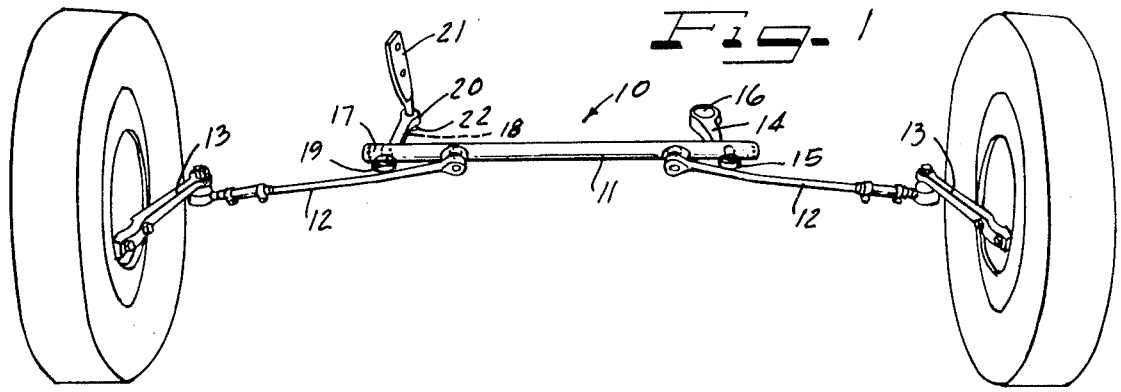
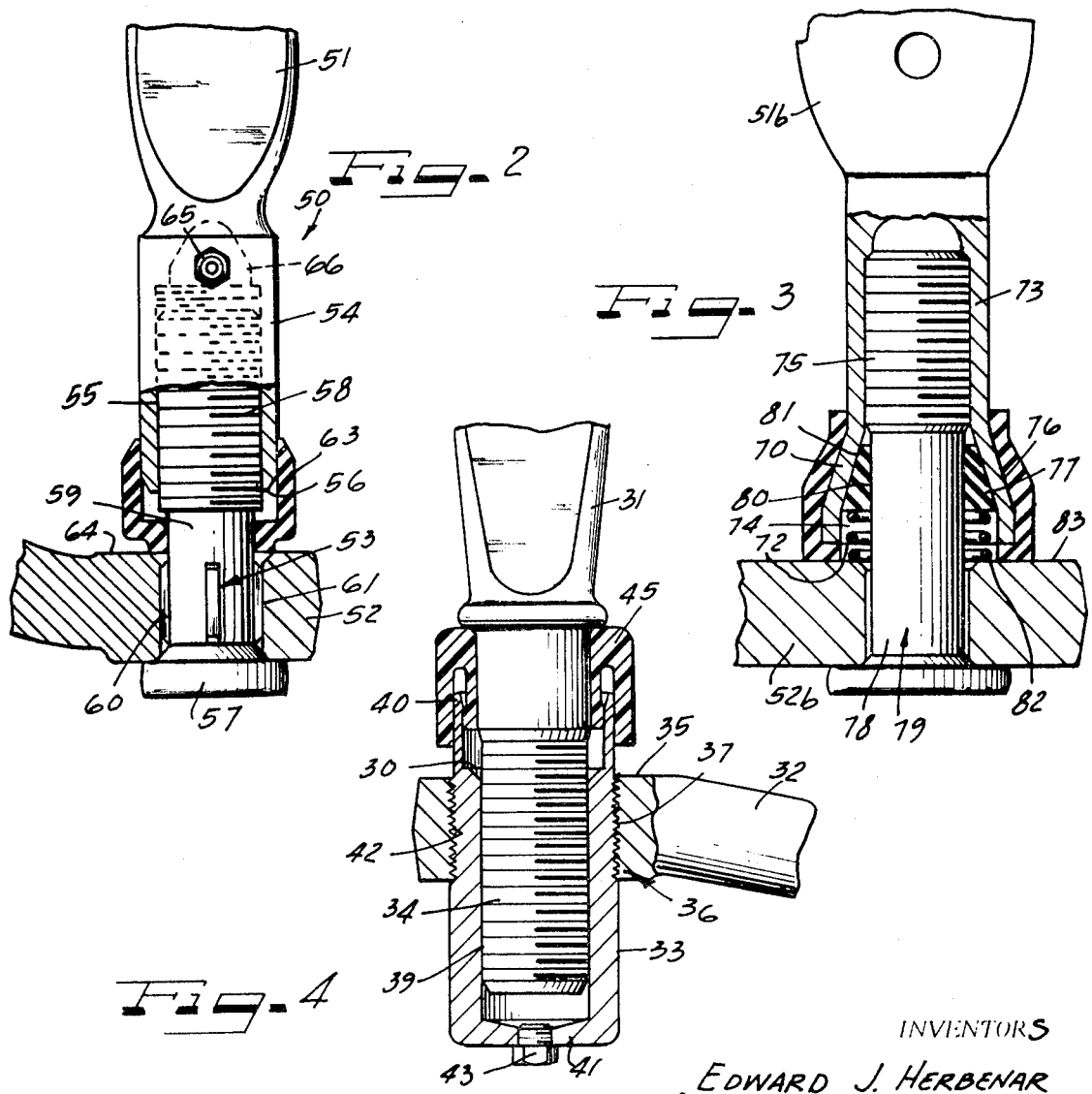
INVENTORS
EDWARD J. HERBENAR
BY Hill, Sherman, Meroni, Gross & Simpson
ATTORNEYS

IDLER ARM JOINT

BACKGROUND OF THE INVENTION

1. Field of the Invention

This invention relates to steering linkages and more particularly to a bracket support and joint for attaching an idler arm to the automobile frame in a pivotable manner.

2. Prior Art

Steering linkages for the dirigible wheels of a vehicle often make use of an idler arm to support one end of the center link. The other end of the center link is usually attached to the pitman arm which moves arcuately in dependent response to movement of the steering gearbox. The idler arm has one end thereof attached to the center link in a pivotable manner and the other end thereof attached to a frame-carried bracket, also in a pivotable manner.

The attachment of the idler arm to the bracket requires a joint which will allow the idler arm to rotate circumferentially around the bracket, but which limits its movement vertically. Mating thread joints are often used for this connection with the idler arm being attached to one of the threaded members and the bracket terminating in the other threaded member. In this manner, the idler arm rotates by threading or unthreading and is supported by the indexing of the threads. Because the idler arm does not rotate greater than 180°, the axial motion caused by the pitch of the threads is minimal throughout the rotation.

Prior art joints of this type have normally included a bracket member having an externally threaded rod end which depends from the frame of the vehicle, an internally threaded cap adapted to be threaded onto the rod end, and external threads on the cap for the attachment of the internally threaded idler arm end piece.

In producing such three-piece joints (idler arm, cap and bracket) it has heretofore been necessary to extensively machine the internally and externally threaded cap. Further, because the cap opens upwardly, grit and water can flow, by the force of gravity, into the mating thread area between the cap and the bracket where it may damage the threads and impair operation of the joint.

SUMMARY OF THE INVENTION

This invention provides a mating thread joint for an idler arm and support bracket which consists of an internally threaded bracket member and a rolled threaded pin which is press fitted into an aperture in the end of the idler arm and thereafter threaded into the bracket.

The disclosed joint overcomes problems encountered in prior art joints while providing an inexpensive construction which greatly reduces the amount of machining necessary to create the joint. Further, because the pin extends upwardly into the internally threaded bracket, grit and water will not flow into the mating area by force of gravity.

In a preferred embodiment, space is left above the termination of the pin in the internally threaded bracket for a grease supply which allows continued lubrication of the joint by gravity feed of grease. In an alternative embodiment, the bottom end of the bracket is flared and receives a spring-biased circumferential wedge wear takeup member which acts to retain axial symmetry of the joint members thereby reducing or eliminating joint wobble caused by wear.

It is therefore an object of this invention to provide an improved idler arm joint.

It is another and more specific object of this invention to provide an idler arm pivot joint manufacturable with a minimum amount of machining.

It is yet another and more important object of this invention to provide a wear-resistant mating thread idler arm joint.

It is yet another and specific object of this invention to provide an idler arm bracket joint wherein the bracket has one end attached to the frame of the vehicle, the bracket depending therefrom and terminating in an internally threaded member which receives an externally threaded idler arm carried pin which is press fit into the idler arm.

It is a general object of this invention to provide an inexpensive long-lasting mating thread rotatable joint.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a perspective view of a steering linkage and dirigible wheel assembly.

FIG. 2 is a fragmentary, cross-sectional view of the joint of this invention.

FIG. 3 is a fragmentary, cross-sectional view similar to FIG. 2 of a modified joint according to this invention.

FIG. 4 is a fragmentary, cross-sectional view of a prior art idler joint.

DESCRIPTION OF THE PREFERRED EMBODIMENTS

FIG. 1 illustrates a steering linkage assembly 10 consisting of a center link 11, tie rods 12 and wheel brackets 13. The center link 11 is attached on one end to a pitman arm 14 through a joint 15 at one end of the pitman arm. The other end of the pitman arm 16 is attached to the steering gear of the vehicle. The other end 17 of the center link 11 is attached to an idler arm 18 by means of a joint 19 at one end thereof. The end of the idler arm 20 remote from the end 19 is pivotably attached to the frame of the vehicle through a bracket 21 which terminates in a pivotable joint 22.

As the pitman arm 14 rotates under the influence of the steering gear, the center link 11 is moved longitudinally in an arc. The idler arm 18 functions as a support for the end 17 of the center link and allows it to move in the arc necessitated by movement of the pitman arm. In order to provide for the arcuate movement of the center link, pivot joints must be provided at both ends of the idler arm. However, because the movement is basically arcuate in a horizontal plane, it is not necessary for the joint 22 to move other than rotatably. It has therefore been common in the art to provide a thread on the end of the bracket 21 which is received in an internally threaded member attached to the idler arm 20. The mating threads are dimensioned with respect to one another so that the torque force necessary to turn one with respect to the other is set at a desired level. Because the idler arm 18 moves only through a fraction of a circle, the axial movement caused by the pitch of the threads does not affect the function of the steering linkage.

FIG. 4 illustrates, cross-sectionally, a prior art idler arm joint 30 which functions as the joint 22 in FIG. 1. The joint consists of the bracket member 31, the idler arm 32 and a connecting member 33. The bracket member 31 terminates in an externally threaded cylindrical end 34. The end 35 of the idler arm 32 has an aperture 36 therein which is internally threaded as at 37. The connecting member 33 has a central cup-shaped bore 39 extending thereinto from one end 40 and terminating in a backwall 41. The cup-shaped bore is threaded to mate with the threaded end 34 of the bracket 31.

THe connecting member 33 also has external threads 42 around its central section which mate with the internal threads 37 of the bore 36 of the idler arm. A grease fitting 43 may extend into the backwall 41 of the connecting member for supplying grease to the mating threads between the end 34 of the bracket member and the internal threads of the connecting member. A seal 45 may be utilized to protect the open end of the connecting member.

The connecting member 33 is, of necessity, subject to a great deal of machining in order to produce the internal and external threads which are normally of a different hand and pitch. Further, the bracket 31, due to its size, shape and weight, presents manufacturing difficulties in the formation of the threaded ends. In addition, the interior of the idler arm bore must be threaded to receive the connecting member.

Inasmuch as the connecting member 33 opens upwardly, as the seal 45 encounters wear, it is possible for water and grit to run downwardly, by the force of gravity, into the connecting member where it may interfere with the operation of the joint. Additionally, because grease is normally supplied to the bottom end of the connecting member, it is possible for the upper threads joining the connecting member to the bracket to run dry, thereby encountering severe wear.

These deficiencies in the prior art joints are overcome by my invention which provides a joint incorporating a rolled-pin connecting member which cooperates with internal threads in the end of the bracket member to provide the joint.

FIG. 2 illustrates an idler arm joint 50 according to this invention. The joint 50 consists of a bracket member 51, an idler arm 52, and a connecting member 53. The joint end 54 of the bracket 51 has an internal bore 55 therein from the end 56 thereof. The bore 55 is threaded.

The connecting member 53 is a cylindrical pin having a head 57 at one end thereof and a threaded cylindrical portion 58 at the other end thereof. Intermediate the head 57 and the threaded portion 58 is a cylindrical portion 59 which may be ribbed as at 60. The connecting member 53 may be manufactured as by rolling rather than machining. The male threads 58 are configured to mate with the female threads of the internal bore 55 of the bracket member.

The idler arm 52 has a bore 61 therethrough which has an internal diameter dimensioned with respect to the diameter of the connecting member 53 in the area of the ribs 60 such that the connecting member 53 may be press fit into the bores 61 with the ribs 60 thereof cutting into the material of the idler arm to provide a secure fastening which is resistant to rotation. A seal member 63 may be utilized to seal the space between the bracket, the connecting member and the face 64 of the idler arm.

It can therefore be seen that this construction provides a reduced-cost joint which consists of three basic parts having two threaded surfaces. Further, the connecting member 53 may be economically produced as by rolling. An added advantage is the fact that the connecting member 53 projects upwardly into the bore of the bracket whereby a grease fitting 65 may be placed above the terminal end of the connecting member 53 and communicate to a grease area 66. This provides a grease supply above the threaded area. Further, flow of grit and water into the thread-connecting areas is eliminated inasmuch as the female threaded opening in the bracket projects downwardly and water and grit will naturally run off exterior of the thread connection.

FIG. 3 illustrates a modification of the joint of FIG. 2 wherein the end 70 of the bracket 51b is flared radially outwardly to provide a large-diameter opening 72. Although FIG. 3 illustrates the opening 72 as being produced by a flared end, it is to be understood that the bracket end could be thicker and that the central bore 73 could be counterbored at the end to provide the space 74 extending from the end opening 72 to the threaded area 75. Either method produces a frustoconical portion adjacent the opening 72 reducing in diameter to threaded area 75.

A bearing member 77 is positioned in the frustoconical area radially outwardly from the central cylindrical portion 78 of the connecting member 79. The bearing member 77 may consist of two hemispherical members, each of which has an axial inner diameter wall 80 and a frustoconically tapered outer diameter wall 81. The outer diameter wall 81 mates with the frustoconical portion 76 of the bracket 73. During use of the joint, radial pressures and/or wear can combine to create a misalignment between the connecting member 79 and the bracket. The bearing member 77 functions as a wear takeup device assuring proper alignment between the connecting member 79 and the bracket.

THe wear takeup bearing 77 is backed by a coil spring 82 which bottoms against the wall 83 of the idler arm 52b. The coil spring 82 is normally installed in a state of compression where it acts to force the bearing member 77 against the frustoconical portion 78 of the bracket in the direction of the threaded areas of the connecting member and bracket. Due to the mating frustoconical faces of the bearing member and bracket, a wedge wear takeup device is provided which will maintain proper alignment between the connecting member and the bracket compensating for wear which would otherwise allow radial movement of the connecting member within the bracket.

It can therefore be seen from the above that my invention provides an improved idler arm thread connection joint wherein the connecting member between the bracket and the idler arm may be rolled.

Although the teachings of my invention have herein been discussed with reference to specific theories and embodiments, it is to be understood that these are by way of illustration only and that others may wish to utilize my invention in different designs or applications.

I claim as my invention:

1. An idler arm joint and support for automotive steering linkages which comprises: an idler arm linkage member, a bracket member, a connecting member, said linkage member having an aperture in one end thereof, said bracket member having a female threaded bore in one end thereof, said connecting member having male threads at one end thereof adapted to be received in the female threaded bore of the said bracket member, said connecting member having an upset head at the other end thereof, said connecting member dimensioned to be received within the bore of said idler arm with the head thereof on one side of the linkage member and the threaded end thereof on the other side of the linkage member received in the female threaded bore of the bracket, and means preventing relative rotation between the connecting member and the linkage member.

2. The joint of claim 1 wherein the said connecting member has a cylindrical ribbed portion intermediate the said head and the said male threaded portion, the said ribbed portion dimensioned with respect to the aperture in the said idler arm and press fit thereinto with the ribs providing a secure fastening resisting rotation between the said connecting member and the said linkage member.

3. An automotive steering linkage idler arm joint comprising: a bracket having one end thereof attached to the frame of a vehicle with the other end thereof depending from the vehicle and having an internal threaded bore projecting thereinto from the bottom end, an idler arm linkage member having a bore adjacent one end thereof, a rolled connecting pin press fitted into the bore in the linkage member with one end thereof projecting above the said linkage member, the said end having external threads thereon adapted to mate with the internal threads of the said bracket, the said pin threaded into the said bracket, a portion of the bore in said bracket extending above the end of the said connecting member, a grease fitting communicating the exterior to said portion, a seal member sealing the space between the said linkage member and the said bracket, and means preventing relative rotation between the connecting member and the linkage member.

4. The linkage of claim 3 wherein the bottom end of the said bracket has an increased-diameter frustoconical interior portion surrounding a cylindrical portion of the said pin, and a wedge bearing is provided in the bore of the said bracket with a frustoconical exterior surface cooperating with the frustoconical interior surface of the bracket to properly align the connecting pin, the said bearing being biased away from the linkage member.

* * * * *